United States Patent [19]

Helmer et al.

[11] 4,222,290
[45] Sep. 16, 1980

[54] SECURING DEVICE FOR PLANET BOLTS IN PLANETARY GEAR CHANGE-SPEED TRANSMISSIONS

[75] Inventors: Josef Helmer, Aich; Jürgen Pickard, Wernau, both of Fed. Rep. of Germany

[73] Assignee: Daimler-Benz Aktiengesellschaft, Fed. Rep. of Germany

[21] Appl. No.: 852,202

[22] Filed: Nov. 17, 1977

[30] Foreign Application Priority Data

Nov. 19, 1976 [DE] Fed. Rep. of Germany ....... 2652652

[51] Int. Cl.² .............................................. F16H 1/28
[52] U.S. Cl. ..................................................... 74/801
[58] Field of Search ..................... 74/801, 750 R, 789, 74/797, 467; 403/326, 154, DIG. 7, 360; 285/321; 184/13 R, 6.12; 29/509

[56] References Cited

U.S. PATENT DOCUMENTS

| 809,338 | 1/1906 | Symmonds | 74/789 |
|---|---|---|---|
| 2,398,532 | 4/1946 | Keehn | 29/509 |
| 2,619,817 | 12/1952 | Lenton | 29/509 |
| 2,959,073 | 11/1960 | Doerfer et al. | 74/801 |
| 3,527,121 | 9/1970 | Moore | 74/760 |
| 3,540,760 | 3/1969 | Miller et al. | 285/321 |
| 3,667,324 | 6/1972 | Laing | 74/750 R |
| 4,104,933 | 8/1978 | Campbell | 74/801 |

Primary Examiner—Peter M. Caun
Attorney, Agent, or Firm—Craig and Antonelli

[57] ABSTRACT

A securing arrangement for planet bolts in planetary gear change-speed transmissions, especially those for motor vehicles, in which all planet bolts are secured against axial displacement on one side by means of a common sheet metal locking plate adapted to be fixed at the planet gear carrier. Each planet bolt is provided on its side facing the locking plate with an annular groove for mounting therein a securing ring while the bores in the planet gear carrier intended for the accommodation of the planet bolts are enlarged on the side facing the locking plate into an axial groove open toward the outside so that after the insertion of the bolts together with the securing rings, the locking plate can be mounted axially over all bolts.

12 Claims, 6 Drawing Figures

SECURING DEVICE FOR PLANET BOLTS IN PLANETARY GEAR CHANGE-SPEED TRANSMISSIONS

The present invention relates to a securing and locking arrangement for planet bolts in planetary gear change-speed transmissions, especially such as used in motor vehicles, whereby all planet bolts are secured or fixed against axial displacement in the planet gear carrier on one side by means of a common sheet metal locking plate fixed at the planet gear carrier.

A planet bolt securing arrangement of the aforementioned type is disclosed in the U.S. Pat. No. 3,527,121. The planet bolts thereby project laterally beyond the carrier by a considerable extent and are provided thereat within this area with a cord-like groove. The sheet metal locking plate has circularly shaped openings which fit over the planet bolts and which terminate in a narrow lateral pocket whose one flank is drawn-in and engages into the cord-shaped slots of each planet bolt. The sheet metal locking plate is thereby slipped over the planet bolts by means of the round openings, and is then rotated in the circumferential direction so far until the engagement into the cord-like slots at the bolts has taken place. In this position, the locking plate is then screwed fast at the carrier by several lateral bolts.

The disadvantage of this prior art securing arrangement resides especially in an additional axial lengthening as a result of the bolt heads of the securing bolts and as a result of eventually necessary washers as securing means against the loosening of these bolts. Additionally, the assembly is very complicated since the sheet metal locking plate engages into the bolts in only one predetermined position. All parts must therefore be coordinated to one another in a predetermined position for the rotation of the locking plate. The threaded connection with the planet carrier requires an accurate coordination of through-hole in the locking plate and thread in the planet carrier. Also, the manufacture of the bolt and of the sheet-metal locking plate is relatively costly.

The present invention is therefore concerned with the task to avoid the described disadvantages. In other words, altogether a shortening of the structural length and a refinement both of the manufacture as also of the assembly is to be achieved by the present invention.

The underlying problems are solved according to the present invention with the securing and locking arrangements described hereinabove in that each planet bolt includes on its side facing the sheet metal locking plate, a ring-groove for the accommodation of a locking ring, in that the bores in the planet gear carrier intended for the accommodation of the planet bolts are enlarged on the side facing the locking plate into a groove open in the axially outward direction and in that—fter the insertion of the bolts together with the securing rings—the locking plate is slipped axially over all bolts. If the planet gear carrier is manufactured as a sheet metal part, then the annular groove is produced by a corresponding stamping or embossment. It is thereby further proposed according to the present invention that short axial pins are arranged at the planet gear carrier between the bolts which extend through corresponding bores in the locking plate and are peened over.

Also in this case the pins can be produced without additional operation by a corresponding construction of the stamping or blanking tool if the carrier is constructed as sheet-metal part.

The transmission is shortened in an advantageous manner by the construction according to the present invention. Neither the planet bolts nor the locking pins extend significantly over the thickness of the sheet-metal locking plate. Furthermore, no coordination problems exist any longer since the planet bolts need no longer be brought into a predetermined position. Instead, the sheet-metal locking plate fits over the bolts in every position. The assembly and also the manufacture of the individual parts is therefore extraordinarily simple, especially if it involves sheet-metal stamped-out parts.

According to a further feature of the inventive concept, the sheet-metal locking plate may serve simultaneously as oil collection for an accurately predetermined lubrication of the bolt bearing. It is proposed therefore in detail that the locking plate is flanged over outwardly along the inner circumference away from the planet carrier and in that at least one bore pointing obliquely outwardly toward the bearing is provided in the planet gear carrier at the inner circumference. In this manner, an oil-collecting pocket results, out of which the oil can then flow to the bearing through one or several bores. Another possibility resides according to the present invention in that the locking plate is flanged over toward the planet carrier along the inner circumference into an oil guide or deflection plate which is conically enlarged in the outward direction. The locking plate itself forms in that case an oil-collecting funnel which then permits the oil to be splashed outwardly onto the bearing.

Accordingly, it is an object of the present invention to provide a securing and locking arrangement for planet bolts in planetary gear change-speed transmissions, especially for motor vehicles, which avoids by simple means the aforementioned shortcomings and drawbacks encountered in the prior art.

Another object of the present invention resides in a securing and locking arrangement for the planet bolts of planetary gear change-speed transmissions which permits the attainment of a relatively short structural length of the assembly without sacrifice in the safety thereof.

A further object of the present invention resides in a securing arrangement for planet bolts in planetary gear change-speed transmissions which greatly simplifies the manufacture and assembly of the various parts.

Still a further object of the present invention resides in a securing device for planet bolts in planetary gear change-speed transmissions which obviates the need for precise alignment of the various parts in the assembly.

Another object of the present invention resides in a locking device of the type described above which readily lends itself to relatively inexpensive mass production techniques.

A still further object of the present invention resides in a securing and locking arrangement for planet bolts in planetary gear change-speed transmissions which can also be utilized by simple means to assure adequate lubrication of the bearings.

These and other objects, features and advantages of the present invention will become more apparent from the following description when taken in connection with the accompanying drawing which shows, for purposes of illustration only, several embodiments in accordance with the present invention, and wherein.

Figure 1:
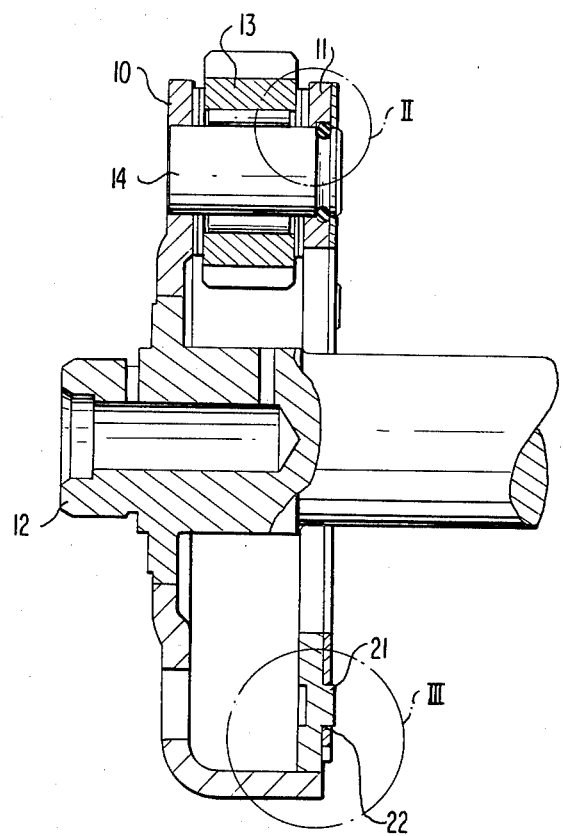
FIG. 1 is an axial cross-sectional view through a planet bolt securing and locking arrangement in accordance with the present invention.
Figure 2:
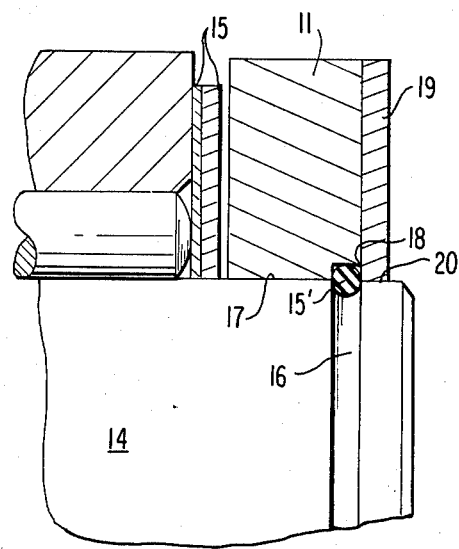
FIG. 2 is a partial cross-sectional view, on an enlarged scale, indicating the details of FIG. 1, encircled by the dash-and-dot circle II.
Figure 3:
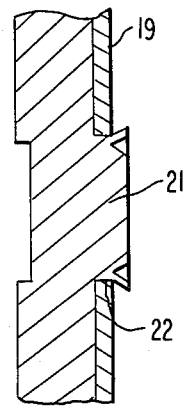
FIG. 3 is a partial cross-sectional view, on an enlarged scale, illustrating the details of FIG. 1, encircled by the dash-and-dot circle III.

Referring now to the drawing wherein like reference numerals are used throughout the various views to designate like parts, according to FIGS. 1 to 3, the planet gear carrier consists of two stamped-out sheet metal parts 10 and 11, whose one part—in this case the disk 10—is bent off drum-shaped along the outer circumference and is connected with the other disk 11, for example, is welded together with the same. This disk 10 is also fixedly connected at its inner circumference with the shaft 12. The planet gears 13 are supported between these two disks 10 and 11 on planet bolts 14. Thrust washers 15 are provided in the usual manner between the gears 13 and the two disks 10 and 11.

The planet bolts 14 are arranged—as usual—in bores of the two carrier sheet-metal members 10 and 11. The securing and locking of the bolts 14 against axial displacement takes place by wire rings 15' which are arranged in an annular groove 16 of the bolts 14. At the corresponding location, the bores 17 are enlarged in the carrier sheet-metal member 11 into an annular groove 18 which, however, is open toward the outside. The open place is closed by a common sheet metal locking plate 19 which includes a bore 20 for each planet bolt 14. Uniformly distributed short pins 21 (FIGS. 1 and 3) are arranged at the carrier sheet metal member 11 between the bolt bores 17, over which the sheet metal locking plate 19 also engages by means of bores 22.

During the assembly, the planet bolts 14 are equipped with the securing or locking rings 15' and are pressed into the bores 17 of the carrier sheet metal members until the securing or locking rings 15' disappear in the enlargement 18. Subsequently as shown in FIG. 3, the locking plate 19 is mounted over this assembly and is fixed in this position by peening over the pins 21. The planet bolts 14 are axially secured in this manner against displacement.

Figure 4:
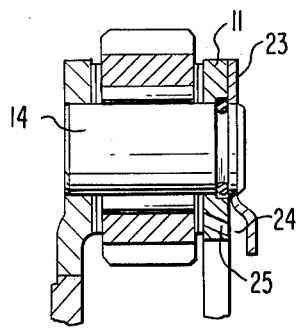
FIG. 4 is a partial cross-sectional view of a modified embodiment of a planet bolt securing and locking arrangement in accordance with the present invention with a locking plate constructed as oil collection.

According to FIG. 4, the sheet-metal locking plate 23 is flanged over outwardly along the inner circumference thereof so that an oil-collecting pocket 24 results. One or several bores 25 are provided in the carrier sheet-metal member 11 which extend out of the oil-collecting pocket 24 obliquely outwardly toward the bearing of the planet bolts 14. The splash oil is collected in the pocket 24 and is now able to flow to the bearing under the centrifugal force effect through the bores 25 so that the bearing is always well-lubricated.

Figure 5:
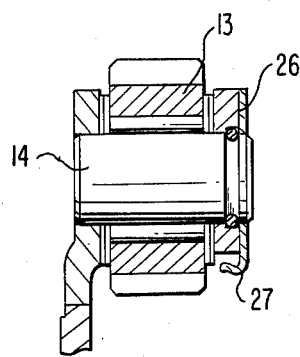
FIG. 5 is a still further modified embodiment of a securing and locking arrangement, similar to FIG. 4, with a modified construction of the locking plate as oil collection.

According to FIG. 5, the sheet-metal locking plate 26 is flanged over inwardly along the inner circumference thereof, i.e., in the direction toward the planet gears and forms thereat a funnel 27 that is conically enlarged in a direction away from the gears. The spray oil can now collect in this funnel and can splash off onto the bearing of the planet gears 13. The axial securing and locking of the planet bolts 14 is exactly the same in this embodiment as also in the embodiment according to FIG. 4 as described in connection with FIGS. 1 to 3.

Figure 6:
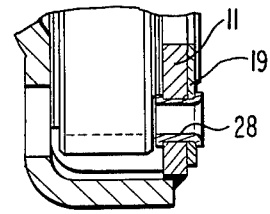
FIG. 6 is a partial cross-sectional view through still another embodiment of a planet bolt securing and locking arrangement according to the present invention of riveted construction.

A further possibility of the fastening of the locking plate 19 at the planet carrier 11 according to a riveted construction is illustrated in FIG. 6, and more particularly by means of tubular rivets 28 with a flat head. In this construction, the rivet head projects beyond the locking plate 19 only by 0.5 mm. corresponding to the tube thickness, i.e., a particularly short type of construction results. Favorable for the riveted construction is the fact that a renewed use of the planet carrier is possible, for example, by grinding off the rivet heads and punching through of the rivets. During the manufacture of the sheet-metal planet carrier, bores are immediately punched out through the one lateral sheet metal part in order to assure a simple and safe riveting operation.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A securing arrangement for planet bolt means in planet gear change-speed transmissions, in which planet bolt means are secured in a planet gear carrier means against axial displacement on one side by a common securing means operable to be fixed at the planetary gear carrier means, characterized in that a securing ring means is provided for each planet bolt means, an annular groove is provided in each planet bolt means for accommodating a respective securing ring means, bore means are provided in the planet gear carrier means for respectively accommodating the planet bolt means, each of said bore means are enlarged on a side facing the common securing means into a groove axially open toward the outside, the securing ring means are pressed into the respective annular grooves prior to an insertion of the planet bolt means into the respective bore means, and in that the common securing means is axially mounted over all of the planet bolt means after an insertion of the planet bolt means so as to axially secure all of the planet bolt means against displacement.

2. A securing arrangement according to claim 1, characterized in that the common securing means is a sheet metal locking plate.

3. A securing arrangement according to claim 2, characterized in that short axial pins are arranged at the planet gear carrier means between the planet bolt means, and in that the securing means engages with corresponding bores over said short axial pins when said pins are peened over.

4. A securing arrangement according to claim 3, characterized in that the securing means serves simultaneously as oil collection means for the lubrication of a bolt bearing and in that means are provided in the planet gear carrier means for directing oil for the oil collector means to the bolt bearing.

5. A securing arrangement according to claim 4, characterized in that flat head hollow rivet means are provided for riveting the sheet metal locking plate to the planet gear carrier means.

6. A securing arrangement according to claim 1, characterized in that short axial pins are arranged at the planet gear carrier means between the planet bolt means, and in that the securing means engages with corresponding bores over said short axial pins when said pins are secured.

7. A securing arrangement according to claim 1, characterized in that the securing means serves simultaneously as oil collection means for the lubrication of a bolt bearing and in that means are provided in the planet gear carrier means for directing oil for the oil collector means to the bolt bearing.

8. A securing arrangement according to claim 7, characterized in that the securing means is flanged over at the inner circumference toward the planet gears into an oil guide plate means of the oil collection means, and in that the oil guide plate means is funnel-shaped and enlarged in an outward direction.

9. A securing arrangement according to claim 1, characterized in that the securing means is a sheet metal locking plate, and in that flat-head hollow rivets are provided for riveting the securing means to the planet gear carrier means.

10. A securing arrangement for planet bolt means in planet gear change-speed transmissions, in which planet bolt means are secured in a planet gear carrier means against axial displacement on one side by a common securing means operable to be fixed at the planet gear carrier means, characterized in that each planet bolt means is provided on a side facing the securing means with an annular groove for the accommodation of a securing ring means, bores in the planet gear carrier means, intended for the accommodation of the planet bolt means, are enlarged on a side facing the common securing means into a groove axially open toward the outside, after insertion of the planet bolt means together with the securing ring means, the common securing means is axially mounted over all of the bolt means, the securing means is formed as a sheet-metal locking plate, short axial pins are arranged at the planet gear carrier means between the planet bolt means, the securing means is engageable with corresponding bores over said short axial pins when said pins are peened over, the securing means simultaneously serves as an oil collection means for lubrication of a bolt bearing, the sheet-metal locking plate is flanged over outwardly at an inner circumference away from the planet gear carrier means, and in that bore means are provided in the planet gear carrier means at the inner circumference thereof which extend obliquely outwardly toward the bolt bearing.

11. A securing arrangement for planet bolt means in planet gear change-speed transmissions, in which planet bolt means are secured in a planet gear carrier means against axial displacement on one side by a common securing means operable to be fixed at the planetary gear carrier means, characterized in that each planet bolt means is provided on its side facing the securing means with an annular groove for the accommodation of a securing ring means, bores in the planet gear carrier means, intended for the accommodation of planet bolt means, are enlarged on a side facing the common securing means into a groove axially open toward the outside, after insertion of the planet bolt means together with the securing ring means, the common securing means is axially mounted over all of the planet bolt means, the common securing means is formed as a sheet-metal locking plate, short axial pins are arranged at the planet gear carrier means between the planet bolt means, the securing means engages with corresponding bores over said short axial pins when said pins are peened over, the securing means serves simultaneously as an oil collection means for the lubrication of the bolt bearing, the sheet-metal locking plate is flanged over at an inner circumference toward the planet gears into an oil guide plate means of the oil collection means, and in that the oil guide plate means is funnel-shaped and enlarged in an outward direction.

12. A securing arrangement for planet bolt means in planet gear change-speed transmissions, in which planet bolt means are secured in a planet gear carrier means against axial displacement on one side by a common securing means operable to be fixed at the planetary gear carrier means, characterized in that each planet bolt means is provided on a side facing the securing means with an annular groove for the accommodation of a securing ring means, bores in the planet gear carrier means, intended for the accommodation of the planet bolt means, are enlarged on a side facing the common securing means into a groove axially open toward the outside, after insertion of the planet bolt means together with the securing ring means, the common securing means is axially mounted over all of the planet bolt means, the securing means simultaneously serves as an oil collection means for lubrication of a bolt bearing, the securing means is flanged over outwardly at an inner circumference away from the planet gear carrier means, and in that bore means are provided in the planet gear carrier means at an inner circumference thereof which extend obliquely outwardly toward the bolt bearing.

* * * * *